United States Patent Office 3,110,819
Patented Nov. 12, 1963

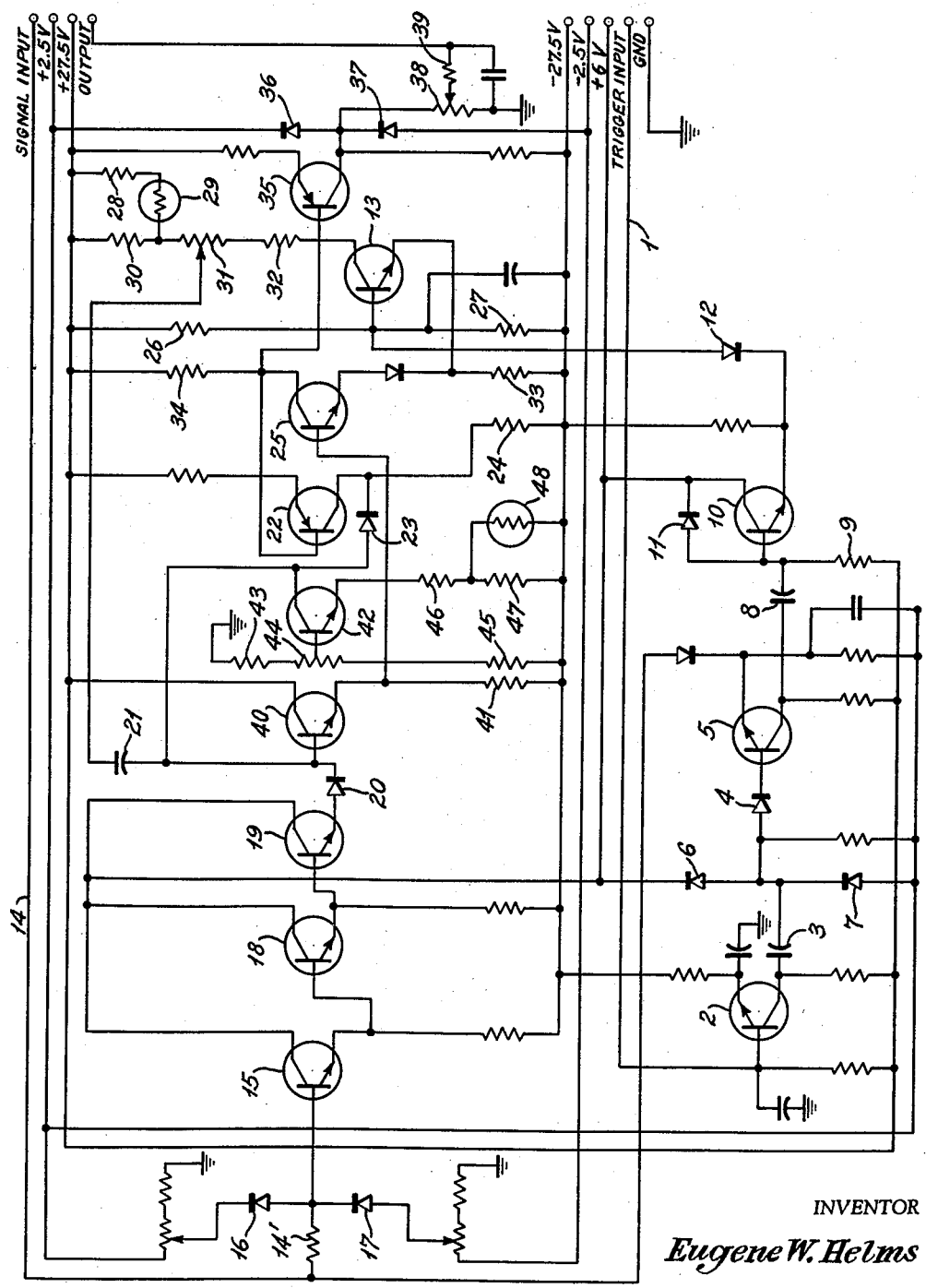

3,110,819
TELEMETERING KEYER CIRCUIT
Eugene W. Helms, Dallas, Tex., assignor to Texas Instruments Incorporated, Dallas, Tex., a corporation of Delaware
Filed May 28, 1957, Ser. No. 662,207
6 Claims. (Cl. 307—88.5)

The present invention relates to electrical circuits, and particularly to an electrical circuit adapted to receive a sequence of electrical signals of a certain form or shape and to convert that sequence into a somewhat different form which is more suitable for transmission to a distant point or for recording.

It has become routine in the scientific testing of many things, as in the case of aircraft, guided missiles and other machinery, to place a great many measuring instruments on, in, or about the machine undergoing tests, and to record the measurements made by these instruments during the test. This gives rise to a problem of transmitting the readings of all of these instruments to a central, and often distant, point where they may be recorded or observed.

It has already been suggested that, since the readings of the various instruments are normally produced as electrical signal voltages of varying amplitudes, these signal voltages may be passed through a commutator to place them in a predetermined sequence in a single signal conductor, thus producing in the conductor a time sequence of amplitude-modulated signals. Usually, the ultimate result is a sequence of generally square pulses of varying amplitudes. Such pulses are not easy to transmit or record, and the purpose of this invention is therefore to convert such a sequence of pulses into a more desirable form.

Since the commutator that sequentially connects the various signal sources to the signal line governs the time relation between the signals and the frequency at which the signals are placed in the line, it is also desirable that it be made to generate a trigger current or phasing current for use in the circuit of this invention. This is done by simply placing a radially slotted disk of magnetic material on the same shaft with the commutator and arranging a magnetic pickup so that the disk and pickup will cooperate to generate pulses having a fixed time relation to the signal pulses inserted in the signal line by the commutator.

The principal object of the present invention is to provide a circuit that will receive the aforementioned sequence of signal pulses and the aforementioned trigger or phasing pulses, and will combine these signal pulses and trigger pulses in such a way as to produce a sequence of square wave pulses of substantially constant amplitude, but of varying duration, said duration depending upon the amplitude of the incoming signal pulse.

Another object of the present invention is to accomplish this desirable result in a minimum of space and with the expenditure of a minimum of power, and by use of a circuit as rugged as can be constructed.

Another object of this invention is to provide a system of the type referred to above in which signal input need be turned on only for a fraction of time required for the actual output transmission.

Broadly, the present invention provides a relatively high input impedance circuit capable of following the input signal pulses and placing a charge proportional to the amplitude thereof on an electrical capacitance which shall be referred to as the master capacitance; means for utilizing the trigger current to trigger the discharge of this capacitance through a resistance so as to produce a time constant dependent upon the state of charge of the capacitance, and ultimately upon the amplitude of the input signal; and means for generating a square wave of constant amplitude and of a duration dependent upon the time it takes the capacitance to discharge.

This invention also includes means to disable the signal input circuit so that it will not affect the master capacitance during the generation of the constant amplitude square wave, and it contains other safety features to prevent distortion and erroneous readings.

The output of the circuit of this invention may be used to key a radio transmitter or any other type of intelligence transmitter or may be recorded directly.

Neither the instruments that generate the signal voltages, the commutator or the trigger current generating mechanism are a part of this invention, nor is the radio transmitter or recorder to which the output of this circuit is connected. The circuit, however, is important to the devices that generate the input signals and to the commutator that places them in sequence on the input line, in that the circuit of this invention draws very little current from the input source and requires the commutator to connect the input source to the circuit for only a very short period of time. The input source only has to be connected to the circuit of this invention for a time sufficiently long to charge the master capacitor to a state proportional to the amplitude of the input signal, and not during the period of time consumed by the generation of the output pulse corresponding thereto. In fact, the trigger circuit current is timed to trigger the circuit of this invention just after the master capacitor has been charged, and the input signal thereafter has no control over the circuit of this invention during the entire time of the generation of the output pulse.

The circuit of the present invention has the distinct advantage that the signal information can be stored for subsequent use in determining the transmitter "on time"; the signal pulse itself, however, may be turned off immediately after the transmitter is triggered on.

Other and further objects and advantageous features of the present invention will hereinafter more fully appear from a detailed description of the drawings in which the FIGURE is a schematic diagram of a transmitter circuit embodying the novel features of the present invention.

Referring to the drawing in detail, trigger input pulses, which are separated single-cycle sine wave pulses, pass through line 1 to the base of transistor 2 by means of which the input trigger pulse is amplified greatly. As described above, these trigger pulses are supplied from a separate circuit which forms no part of the present invention.

From the collector of transistor 2 the amplified wave form is fed through capacitor 3 and diode 4 to the base of transistor 5. Diodes 6 and 7 are employed to limit and shape the wave form into a square wave pulse. The resulting square wave pulse is amplified in transistor 5 to a still sharper rising pulse. From the collector of transistor 5 the amplified square wave pulse is differentiated by capacitor 8 and resistor 9 and is then fed to the base of transistor 10. A diode 11 is connected between the collector and the base of transistor 10 for the purpose of clamping the base to plus 6 volts. The resulting output pulse from transistor 10 is a sharp negative pulse which is clamped to start from plus 6 volts. This sharp negative pulse is fed through diode 12 to the base of transistor 13. As will hereinafter appear, when this sharp negative pulse is fed to the base of transistor 13 the transmitter becomes operative.

At the same time that the trigger pulse is being generated, shaped, etc., signal pulses are being fed through the signal input line 14 and through the input resistance 14' into the base of transistor 15. Since the designed operating voltages of the incoming signals range from minus 2½ volts to plus 2½ volts, signals of greater amplitude than this have no effect and are clipped by diodes 16 and 17 in the base circuit of transistor 15. Transistors 15 and 18 constitute emitter follower circuits for the purpose of providing low impedance output circuits to match the low impedance of the next following circuit. The signal input is fed through transistor 19 and diode 20 to charge the master capacitor 21 to the level of the signal strength as amplified by the previous stages. The discharge of master capacitor 21 through a time constant circuit (as will hereinafter be more fully described) determines the length of the transmitter pulse. However, before signals of small amplitude are introduced to the circuit it would be desirable to insure that capacitor 21 was always discharged to a level below that of the incoming signal. Transistor 22 and diode 23 are provided for this purpose. Transistor 22 is normally biased to cutoff so that no current is flowing through this transistor or its emitter resistor 24, and consequently no voltage drop is produced across resistor 24. Thus, the diode 23 with its cathode connected, in effect, to the −27.5 v. line, is biased in the forward direction thereby providing a discharge path for capacitor 21 when the transmitter is not energized.

As was described above, the sharp negative pulse from transistor 10 triggers the transmitter on, but the transmitter must remain on for a period of time corresponding to the amplitude of the signal then being sampled. This is accomplished in the following manner: transistors 25 and 13 constitute a single-shot multi-vibrator circuit so biased that transistor 13 is normally conducting and transistor 25 is normally non-conducting. The base of transistor 13 is set at a fixed voltage of approximately 4 volts by its connection to the voltage divider circuit comprising resistors 26 and 27. Thus, the negative pulse from transistor 10 will trigger the circuit but spurious noise pulses below 4 volts will not. The sharp pulse from transistor 10 to the base of transistor 13 immediately cuts off the latter transistor by biasing it below cutoff. As soon as transistor 13 is cut off, current ceases to flow through resistors 28, 29, 30, 31, 32 and 33. This cessation of current flow through resistors 28, 29, 30 and 31 decreases the voltage drop across these resistors to zero, thereby raising the upper plate of capacitor 21 to the positive bias +27.5 v., which, of course, also raises the voltage on the lower plate as well. Also, as soon as the current ceases to flow through resistor 33 the instantaneous voltage on the emitter of transistor 25 drops to minus 27.5 volts and transistor 25 begins to conduct immediately.

As soon as transistor 25 commences to conduct, the current flowing through the resistor 34 will cause a voltage drop to occur on the base of transistor 22 which in turn will cause transistor 22 to conduct. It should be mentioned at this point that transistors 22 and 35 as shown in the drawings are p-n-p type transistors, which become conductive when the base bias becomes negative with respect to the emitter. The remaining transistors shown in the present circuit are of the n-p-n type, which, of course, become conductive when the opposite bias condition is imposed on the elements. When transistor 22 commences to conduct, the volt drop across resistor 24 will bias the diode 23 against conduction, thus eliminating one of the discharge paths for the capacitor 21. The voltage drop through resistor 34 at the same time causes transistor 35 (which, as indicated above, is also a p-n-p type transistor) to conduct. The resulting output pulse taken from the collector of transistor 35 is suitably limited and shaped by diodes 36 and 37. The final output pulse, as taken across potentiometer 38 and resistor 39 then represents the desired measured information in the form of a width-modulated square wave pulse.

As indicated above, the amplitude of the voltage on the lower plate of capacitor 21 is determined by the amplitude of the input signal. When, thereafter, the upper plate of the capacitor 21 rises to 27.5 volts due to the cut-off of transistor 13, transistor 40 will start to conduct and will continue to conduct until the capacitor discharges. Transistor 25 in turn will remain conductive until the potential on its base derived from the voltage drop across resistor 41 in the emitter circuit of transistor 40 drops below 4 volts at which point transistor 25 will be cut off immediately. As soon as transistor 25 is cut off, transistor 35 (which is the output transistor) is immediately cut off, thus causing an interruption in the transmission and transistor 13, which together with transistor 25 forms the multivibrator circuit mentioned above, begins to conduct. The keyer circuit is then again in its normal state ready to receive another trigger pulse and signal pulse.

As is well known, the discharge curve of a capacitor resistance network is generally non-linear but, for purposes of this circuit, it was felt desirable to provide a discharge path for the capacitor 21 which would produce a substantially linear discharge curve; therefore, transistor 42 and its associated bias resistors 43, 44, 45, 46, 47 and 48 are employed for the purpose of providing a substantially constant current and, hence, linear discharge path for the capacitor 21.

Mention was made previously of the desirability of disabling the signal input circuit to prevent input signals affecting the master capacitance 21 during the generation of the constant amplitude square wave to key the transmitter on. Diode 20 in the emitter circuit of transistor 19 provides this disabling function. The anode voltage of diode 20 is never allowed to exceed 2.5 v. by reason of the limiting action of diodes 16 and 17 on the input signal and thus, the voltage on its cathode determines whether or not diode 20 is conductive. With the circuit in its normal state the cathode of diode 20 is biased negative, with respect to the anode, by its return to the −27.5 v. line through the base and emitter of transistor 40 and resistor 41. However, when the transistor 13 is biased to non-conduction by the trigger pulse to its base as explained above, a positive bias is applied to the master capacitance and through it to the cathode of diode 20 biasing this diode in the reverse direction. While so biased, this diode isolates the incoming signal from master capacitance 21 or, in other words, disables the input signal.

From the above it should be apparent that the instant invention provides an output square wave pulse which is width-modulated in accordance with the magnitude or value of the information received by the circuit. Furthermore, since the degree of width-modulation is dependent upon the charge received by the capacitor 21 in the circuit, it should be further apparent that there is no need for the signal input to remain imposed upon the circuits leading into transistor 15 after transmitter commences to operate. Therefore, utilizing this feature of the present invention, it is possible to reduce the time during which the signal input need be applied to a fraction of the time otherwise required.

The bias and pulse voltage values, transistor types, and other values in the circuit specifically set out above are illustrative only and are in no wise intended to limit this application. Other and further modifications of the instant invention apart from those shown or suggested herein may be made within the spirit of this invention which is to be limited only as set forth in the appended claims.

What is claimed is:

1. In a telemetering keyer circuit having an output stage, a signal input stage, and a trigger input stage, means for introducing a signal pulse to said signal input stage, means for introducing a trigger pulse to said trigger input stage in timed relation with the introduction of said signal pulse to said circuit, a capacitor in said circuit adapted to receive a charge proportional to the amplitude of said signal pulse, means responsive to said trigger input stage for initiating conduction of said output stage after said capacitor has received said charge, and means associated with said capacitor for causing continued conduction of said output stage immediately following its initial conduction and for a period of time dependent upon the strength of said charge upon said capacitor.

2. In a telemetering keyer circuit an output stage, means for applying a trigger pulse to said circuit for causing conduction of said output stage, a capacitor, a signal input, means for charging said capacitor to a voltage dependent upon the amplitude of said signal input and prior to the conduction of said output stage, and means responsive to the charge on said capactior for causing continued conduction of said output stage subsequent to the conduction initiated by said trigger pulse, and for a period of time determined by said charge on said capacitor.

3. In a telemetering keyer circuit a normally non-conducting output stage, means for applying a trigger pulse to said circuit for causing conduction of said output stage, a capacitor, a signal input means for charging said capacitor to a voltage dependent upon the amplitude of said signal input prior to the conduction of said output stage, means responsive to the charge on the said capacitor for causing continued conduction of said output stage subsequent to the initial conduction caused by said trigger pulse and for a period of time determined by said charge on said capacitor and means responsive to the introduction of said trigger pulse for disabling said signal input while said output stage is conducting.

4. In a telemetering keyer system for use in transmitting various items of information from a plurality of detecting means in a remote object, a circuit which comprises means for introducing a succession of signals of varying amplitude, means for introducing a series of trigger pulses to the output stage of said circuit, means for amplifying, shaping and differentiating said trigger pulses into sharp negative pulses, means for amplifying said input signals and for impressing voltages corresponding to the value of said input signals upon a master capacitor, a normally non-conducting transistor constituting the output stage of said circuit, means responsive to said sharp negative pulses for initiating conduction of said output stage, means responsive to the charge on said master capacitor for sustaining conduction of said output stage for a period after each initial conduction thereof whereby the output from said output stage consists of a series of square wave pulses which are width-modulated in accordance with the values of the input signals, and means responsive to the introduction of said trigger pulses for disabling said input signals during the periods of conduction of said output stage.

5. A telemetering keyer circuit for use in transmitting various items of information from a plurality of detecting means which comprises means for introducing successive input signals to said circuit, means for introducing successive trigger pulses to said circuit, means for amplifying, shaping and differentiating said trigger pulses into sharp negative pulses, means for amplifying said input signals and for impressing voltages corresponding to the values of said input signals upon a capacitor, a first transistor constituting the output stage for said circuit, a diode and first resistor connected in series and providing a discharge path for said capacitor when said output stage is non-conducting, a second transistor normally non-conducting and having said first resistor in its emitter circuit such that upon conduction of said second transistor said diode becomes biased against conduction thereby eliminating the discharge path of said capacitor through said diode, a third transistor normally conducting and adapted by its conduction to create a voltage drop across a second resistor located in the emitter circuit of said third transistor, a fourth transistor normally non-conducting and having said second resistor in its emitter circuit, each of said sharp negative trigger pulses being applied to the base of said third transistor for immediately cutting off the same, said fourth transistor by virtue of the instantaneous cessation of current flow through said third transistor becoming immediately conductive, said fourth transistor by its conduction causing a negative pulse to be applied to the bases of said first and second transistors thereby causing conduction of the same, a fifth transistor having its base connected to said capacitor and being conductive for a period of time dependent upon the charge voltage on said capacitor, and means responsive to the conduction of said fifth transistor for sustaining conduction of said fourth transistor whereby the output from said first transistor consists of a series of square wave pulses which are width-modulated in accordance with the values of the input signals.

6. A telemetering keyer circuit for use in transmitting various items of information from a plurality of detecting means in a remote object which comprises means for introducing successive signal input pulses into said circuit, means acting in timed relation with the introduction of said signal input pulses for introducing trigger pulses to said circuit for periodically energizing the output stage of said circuit, means for amplifying said trigger pulses and for shaping the so-amplified pulses into a square wave form, means for differentiating the so-shaped trigger pulses into sharp negative pulses, means for amplifying each said signal input pulse and for impressing a voltage corresponding to the value of said signal input pulse upon one plate of a capacitor prior to the introduction of each said trigger pulse to said circuit, a first transistor constituting the output stage of said circuit, a diode and first resistor connected in series and providing a discharge path for said capacitor when said output stage is non-conducting, a second transistor having said first resistor in its emitter circuit such that upon conduction of said second transistor said diode becomes biased against conduction thereby eliminating said discharge path for said capacitor, a third transistor having a second resistor in its emitter circuit and adapted by its conduction to create a voltage drop across said second resistor, a fourth transistor also having said second resistor in its emitter circuit so as to be biased against conduction during the conduction of said third transistor, each of said sharp negative trigger pulses being applied to the base of said third transistor for immediately cutting off the same, said fourth transistor becoming immediately conductive by virtue of the instantaneous cessation of current flow through said third transistor, said fourth transistor by its conduction causing a negative pulse to be applied to the bases of said first and second transistors thereby causing conduction of the same, a fifth transistor having its base connected to said capacitor and being conductive for a period of time dependent upon the charge on said capacitor, and means responsive to the conduction of said fifth transistor for sustaining conduction of said fourth transistor whereby the output from said first transistor consists of a succession of square wave pulses which are width-modulated in accordance with the successive values of said signal input pulses.

References Cited in the file of this patent

UNITED STATES PATENTS

| 2,399,668 | Francis | May 7, 1946 |
|---|---|---|
| 2,419,340 | Easton | Apr. 22, 1947 |
| 2,421,022 | Francis | May 27, 1947 |
| 2,437,707 | Pierce | Mar. 16, 1948 |
| 2,534,535 | Smith et al. | Dec. 19, 1950 |
| 2,540,115 | Hopkinson | Feb. 6, 1951 |
| 2,545,464 | Hoeppner et al. | Mar. 20, 1951 |
| 2,549,874 | Williams | Apr. 24, 1951 |
| 2,662,981 | Segerstrom | Dec. 15, 1953 |
| 2,740,888 | Zukin | Apr. 3, 1956 |
| 2,824,287 | Green et al. | Feb. 18, 1958 |